United States Patent [19]

Heath

[11] Patent Number: 5,187,781
[45] Date of Patent: Feb. 16, 1993

[54] SHARED HARDWARE INTERRUPT CIRCUIT FOR PERSONAL COMPUTERS

[75] Inventor: Chester A. Heath, Boca Raton, Fla.

[73] Assignee: International Business Machines Corp., Armonk, N.Y.

[21] Appl. No.: 915,046

[22] Filed: Jul. 16, 1992

Related U.S. Application Data

[63] Continuation of Ser. No. 452,431, Dec. 19, 1989, abandoned.

[51] Int. Cl.⁵ .............................................. G06F 13/00
[52] U.S. Cl. ............................. 395/325; 364/DIG. 2; 364/927; 364/941; 364/927.93
[58] Field of Search .................. 364/DIG. 1, DIG. 2; 395/325; 307/559, 317.1

[56] References Cited

U.S. PATENT DOCUMENTS

| | | | |
|---|---|---|---|
| 4,103,335 | 7/1978 | Vitali | 364/DIG. 2 |
| 4,621,342 | 11/1986 | Capizzi et al. | 364/900 |
| 4,631,670 | 12/1986 | Bradley et al. | 364/200 |
| 4,974,199 | 11/1990 | Verbanets, Jr. et al. | 364/DIG. 2 |

*Primary Examiner*—Thomas M. Heckler

[57] ABSTRACT

A logic circuit for allowing multiple device adapters to be connected to a single interrupt level in an interrupt level-sharing environment. The circuit provides protection of the adapters from physical damage and provides a vehicle for using certain adapters not designed for use in a level sharing environment to be used in a level sharing environment. The circuit includes means for preventing destructive current flow from one adapter to a second adapter sharing the same interrupt level. The circuit also includes means for converting the rising edge interrupt request signal to a signal useful in a level sensitive system.

1 Claim, 5 Drawing Sheets

SHARED HARDWARE INTERRUPT CIRCUIT FOR PERSONAL COMPUTERS

This is a continuation of application Ser. No. 07/452,431 filed on Dec. 19, 1989 now abandoned.

FIELD OF THE INVENTION

This invention relates to personal computer systems and in particular to a circuit for allowing multiple device adapters to be installed on the same hardware interrupt level, the circuit providing electrical protection to the adapters in case more than one adapter is active at the same time. The circuit would enable certain adapters which presently exist to be used in a level sharing environment, and allow newly designed adapters to be used in a level sharing environment.

BACKGROUND DISCUSSION

Personal computer systems in general, and IBM personal computers in particular, have attained widespread use for providing computer power for many purposes. Personal computer systems can usually be defined as a desk top, floor standing or portable microcomputer that consists of a system unit having a single system processor, a display monitor, a keyboard, one or more diskette drives, a fixed disk storage, and a printer. One of the distinguishing characteristics of these systems is the use of a motherboard or system board to electrically connect these components together. These systems were designed primarily to give independent computing power to a single user and are inexpensively priced for purchase by individuals or small businesses. Examples of such personal computer systems are IBM'S PERSONAL COMPUTER, PERSONAL COMPUTER XT, PERSONAL COMPUTER AT and IBM'S PERSONAL SYSTEM/2 Models 25, 30, 50, 60, 70, and 80 computers.

These systems can be classified into two general families. The first family, usually referred to as Family I Models, use a bus architecture exemplified by the IBM PERSONAL COMPUTER AT. The second family, referred to as Family II Models, use IBM'S MICRO CHANNEL ARCHITECTURE bus exemplified by IBM'S PERSONAL SYSTEM/2 Models 50 through 80 computers. The present invention relates to the Family I group of personal computers.

These systems are being called upon to handle an ever increasing number of input-output (I/O) devices including the devices listed above. Examples of additional such devices would be communication and network devices to allow interfacing with other computers and data bases. These devices are connected to the system planar or motherboard through device adapters plugged in to system I/O connectors. Device adapters use hardware interrupt signals to the system bus to request attention by the microprocessor and by interrupt controllers. The IBM PERSONAL COMPUTER AT has 16 levels of hardware interrupts through its processor, the Intel 80286 microprocessor and the use of two INTEL 8259A interrupt controller chips. Of these, 11 are available for use by I/O devices.

The IBM PERSONAL COMPUTER AT uses an edge-triggered interrupt request signal. That is, where an adapter requests an interrupt so that its device may be serviced, it does so, e.g, by first driving the interrupt request line to a low level and then to a high level. The transition between the low level and the high level is received by the system as an interrupt request signal.

Where the computer is being used for multi-tasking and or by multi-users, it may be desirable to add more devices than there are hardware interrupt levels. This can create system problems. For example, if two tasks were to "talk" to the same printer at the same instant and time, the result would be incomprehensible. Still another task might require a special printer or plotter for output. Most interrupt-supporting adapters were designed to first drive the interrupt request line to a low level and then to a high level to provide a low-to-high edge signal which is interpreted, under control of software drivers, by the microprocessor and by the interrupt controllers as a request for servicing, i.e. a hardware interrupt request signal.

A problem arose where two such devices were connected to the same level interrupt and the devices requested interrupts at the same time or where one interrupt was being handled when a second request was generated. The occurrence of these conditions could cause lost signals and even physical damage to the I/O device adapter.

The IBM PERSONAL COMPUTER AT could be used to provide sharing of an interrupt level between multiple devices, however, this required a change in design of many device adapters which were to share an interrupt request level and created compatibility problems with earlier designed cards. Adapter cards previously designed for non-interrupt level sharing were designed to hold the interrupt request line at a low level and then to drive the line high to generate a request signal. In contrast the shared-interrupt card design, to operate in the IBM PERSONAL COMPUTER AT, the IBM PERSONAL COMPUTER XT or the IBM PERSONAL COMPUTER called for the interrupt request line to float high, through pull-up resistors on each adapter and typically to be driven by open-collector drivers. Each adapter on the line may request an interrupt by momentarily pulsing the line to a low level. The high-to-low transition arms the Interrupt Controller; the low-to-high transition generates the interrupt. It was accordingly not possible in most cases to use the adapters not designed for shared interrupt use in a shared environment. It has been found that the use of more than one adapter card on an interrupt request level, whether specifically designed for interrupt sharing or not, may cause physical damage or loss of signal where more than one of the adapters is active at the same time.

SUMMARY OF THE INVENTION

The present invention allows multiple adapters to be used on a single interrupt level without loss of an interrupt request signal or physical failure of a system element. The present invention utilizes diodes positioned between each adapter and the interrupt request line. Further, a pull-down resistor and a Schmitt trigger are incorporated in the interrupt request line in the preferred embodiment. The diodes prevent the short-circuiting of the adapters when two or more active adapters are in electrical contact with the hardware interrupt request line at the same time. The pull-down resistor and Schmitt trigger are used to convert the diode-modified interrupt signal to a signal which can be utilized by the microprocessor and interrupt controller system under control of software device drivers.

BRIEF DESCRIPTION OF THE DRAWINGS

The above and other features of the present invention are explained in the following written description, taken in conjunction with the accompanying FIGURES wherein.

DESCRIPTION OF A PREFERRED EMBODIMENT

Figure 1:
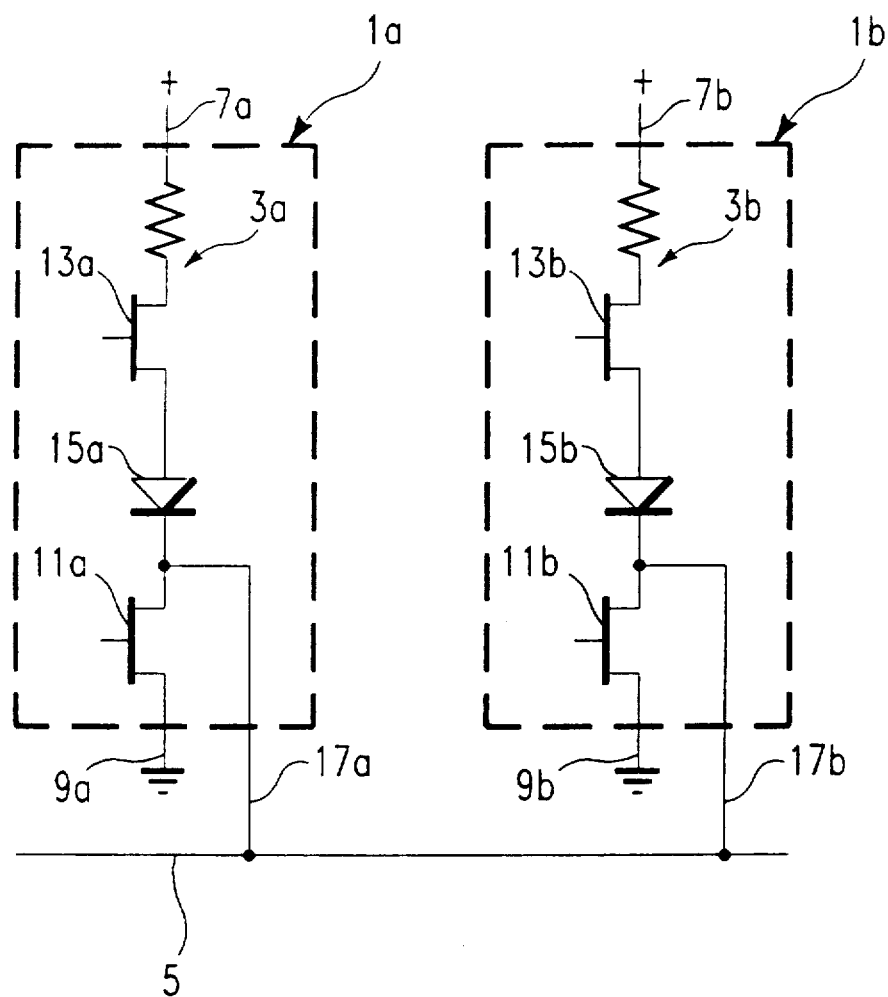
FIG. 1 shows two adapters connected to a single interrupt request line without the features of this invention.

The following detailed description is of the best presently contemplated mode for carrying out the invention. This description is not to be taken in a limiting sense but is made for the purpose of illustrating the general principals of the invention since the scope of the invention is best defined by the appended claims. Similar parts have been given similar reference numerals in the FIGURES.

Referring now to the drawings there is shown in FIG. 1 two device adapter cards shown generally as $1a$ and $1b$. Included on adapter $1a$, $1b$ are edge-triggered interrupt request circuits shown generally as $3a$ and $3b$. As described above the interrupt request signal is a momentary pulse generated by the interrupt request circuit, $3a$, $3b$. The interrupt request line 5 is first pulsed low to arm the Interrupt Controller 22, (see FIG. 3B), and then pulsed high to request the interrupt. The transition from low to high generated by circuits $3a$ and $3b$ and transmitted to the interrupt request line 5 is received by the microprocessor and interrupt controllers as a request for attention by an I/O adapter $1a$, $1b$. To create this transition of the interrupt request line 5 from low to high line 5 must first be driven low and then driven high. Circuits $3a$ and $3b$ provide this transition. Circuits $3a$, $3b$ in this exemplary instance includes power supply lines $7a$, $7b$ and ground lines $9a$, $9b$ which are connected to a common source of power and ground on the system planar when the adapter cards are plugged into the I/O connectors or slots 22 (see FIG. 3C). Each circuit $3a$, $3b$ incorporate a low transistor $11a$, $11b$; a high transistor, $13a$, $13b$, and a diode $15a$, $15b$. An interrupt request signal is generated as follows: The low transistor, $11a$, $11b$ is turned on to drive the interrupt request line 5 to a low level by connecting it, through adapter interrupt request output line $17a$, $17b$ to ground $9a$, $9b$. The signal is then generated by turning the low transistor $11a$, $11b$ off and high transistor $13a$, $13b$ on. This sequence provides the low to high transition, i.e. a rising edge signal, that tells the system that a device adapter is requesting attention through a hardware interrupt request.

The problem with using this design in a shared interrupt environment can now be understood. As an example, assume that adapter 1a has driven interrupt request line 5 to a low level by connecting interrupt request line 5 to ground $9a$ through active transistor $11a$ at the same time that adapter $1b$ high transistor $13b$ is active. This would result in momentarily grounding the system power supply source through power supply line $7b$, transistor $13b$, diode $15b$, and transistor $11a$. This destructive passage of current could result not only in loss of the interrupt request signal from adapter $1b$, but in damage to the physical components such as the transistors. Resistors could be placed between the adapter cards and the interrupt request line to limit the current, however, this solution would decrease the "noise" margin for the logic and aggravate noise problems in the system. These problems can be overcome by the system of the present invention.

Figure 2:
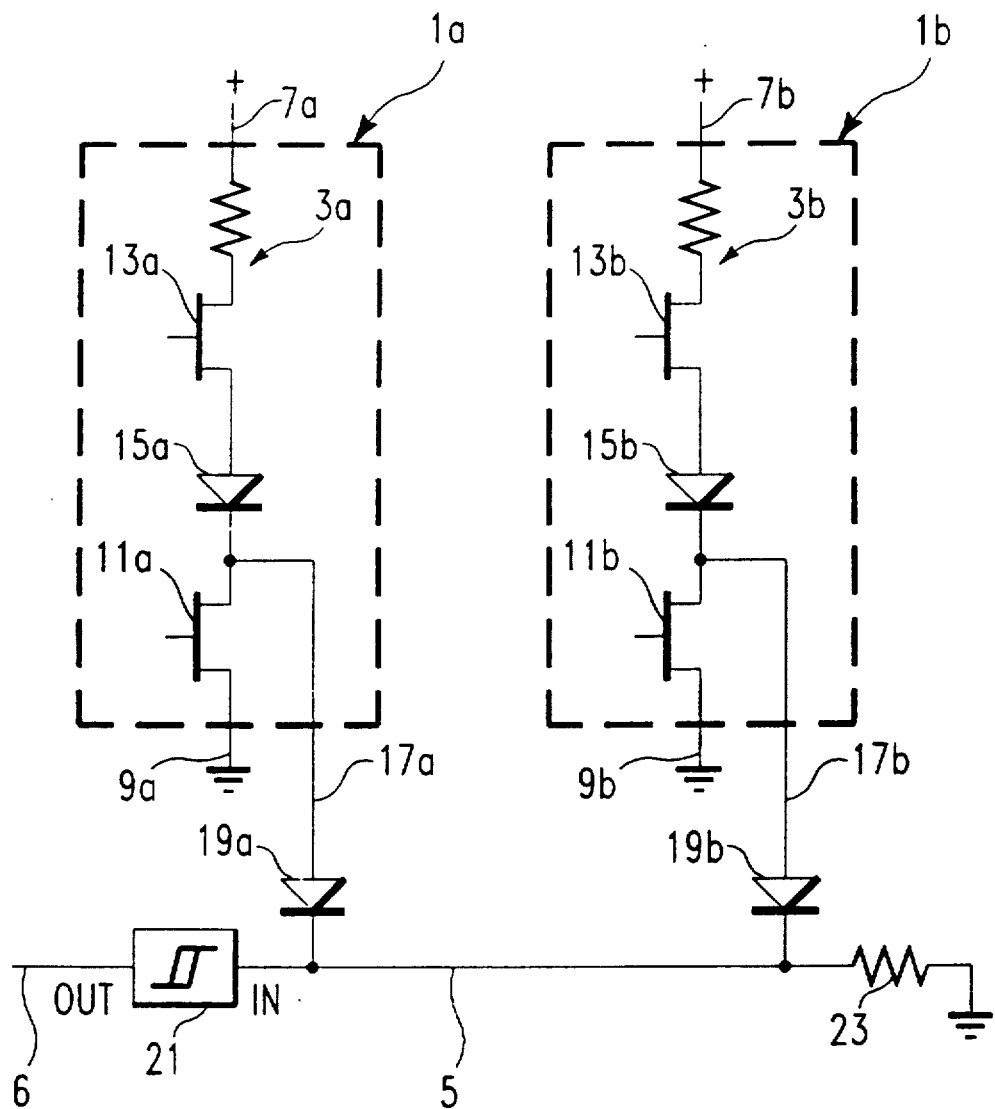
FIG. 2 shows two adapters connected to a single interrupt request line and including the features of this invention.

Referring now to FIG. 2, there is shown a modification to the circuitry shown in FIG. 1 in accordance with the present invention. The advantages of this invention may be obtained by incorporating diodes $19a$, $19b$ between the adapter interrupt request output lines $17a$, $17b$ and the interrupt request control line 5. Diodes $19a$, $19b$ prohibit the passage of current from one adapter e.g. $1a$ to a second adapter $1b$. It is well known that diodes can be designed to prohibit the passage of electrical current in one direction only, and to limit the amount of current passing. The preferred diode for the present concept would be a diode that had a minimal forward voltage drop characteristic. The introduction of these diodes requires other modifications to the system to allow adapter cards $1a$, $1b$ to remain compatible with existing systems. A pull-down resistor and ground shown generally, as 23 are used to keep the interrupt request line 5 at a low level. A Schmitt trigger 21 is provided to detect a slow transition of the signal placed on interrupt request line 5 by adapter card circuit $3a$, $3b$. The output of the Schmitt Trigger 21 is connected to the input of an Interrupt Controller 20 (see FIG. 3B). This combination of components provide in response to the low-to-high signal generated by the adapters $1a$, $1b$ over adapter output lines $17a$, $17b$ a signal on the interrupt request line 6, that transitions from low to high and is suitable as an edge-trigger interrupt request signal.

In operation, if any of the drivers, circuits $3a$ and $3b$ are active high, the interrupt request line 5 will be high. If all drivers are low, or if all drivers are not active, the interrupt request line 5 will be low. The Schmitt trigger inverter 21 inverts this signal to provide a low signal to the processor 29 (see FIG. 3A) and interrupt request controllers 20 over interrupt request bus 6 (see FIG. 3 for a typical planar bus system layout). The following Table demonstrates the possible combination of operations.

| Adapter Output | | Interrupt Request Signal | |
|---|---|---|---|
| 1a | 1b | Original | Inverted |
| 0 | 0 | 0 | 1 |
| 0 | 1 | 1 | 0 |
| 1 | 0 | 1 | 0 |
| 1 | 1 | 1 | 0 |

The original signal is the logical "OR" of all active high requests usable for low-to-high edge detection processes. An inverted signal is the low active level request potentially useable for low level-sensitive, as contrasted to edge-triggered, detection for certain adapter combinations.

No invalid levels are produced and no potential overheating of the adapter circuits will result. The inverted output combination is similar to that produced by open collector drivers in a level sensitive interrupt system such as is used in the Family II models of personal computers listed above.

It should be pointed out that custom software drivers are required to be installed in the operating system of Family I computers for adapters 1a, 1b to be able to share interrupt levels in accordance with the present concept. Further, only adapters that can respond to these drivers and hold the interrupt request active until the activating adapter can be selected from the other possible adapters could be used. These drivers are written to hold the interrupt request low except when the interrupt is requested. On existing adapters, where an active edge-triggered interrupt request is not held low by the hardware, or where software drivers cannot hold the interrupt request line 5 low, these adapters could not share an interrupt level. Many adapters however meet these requirements for sharing, other adapters could be designed to work in non shared edge-triggered systems and also work in the present system.

The present concept provides a level sensitive system that can be operated in a manner similar to the level sensitive system exemplified by the Family II computers. The Schmitt trigger provides a level sensitive, as contrasted to edge-triggered, signal to the processor 24 and interrupt controllers 22.

Figures 3, 3A:
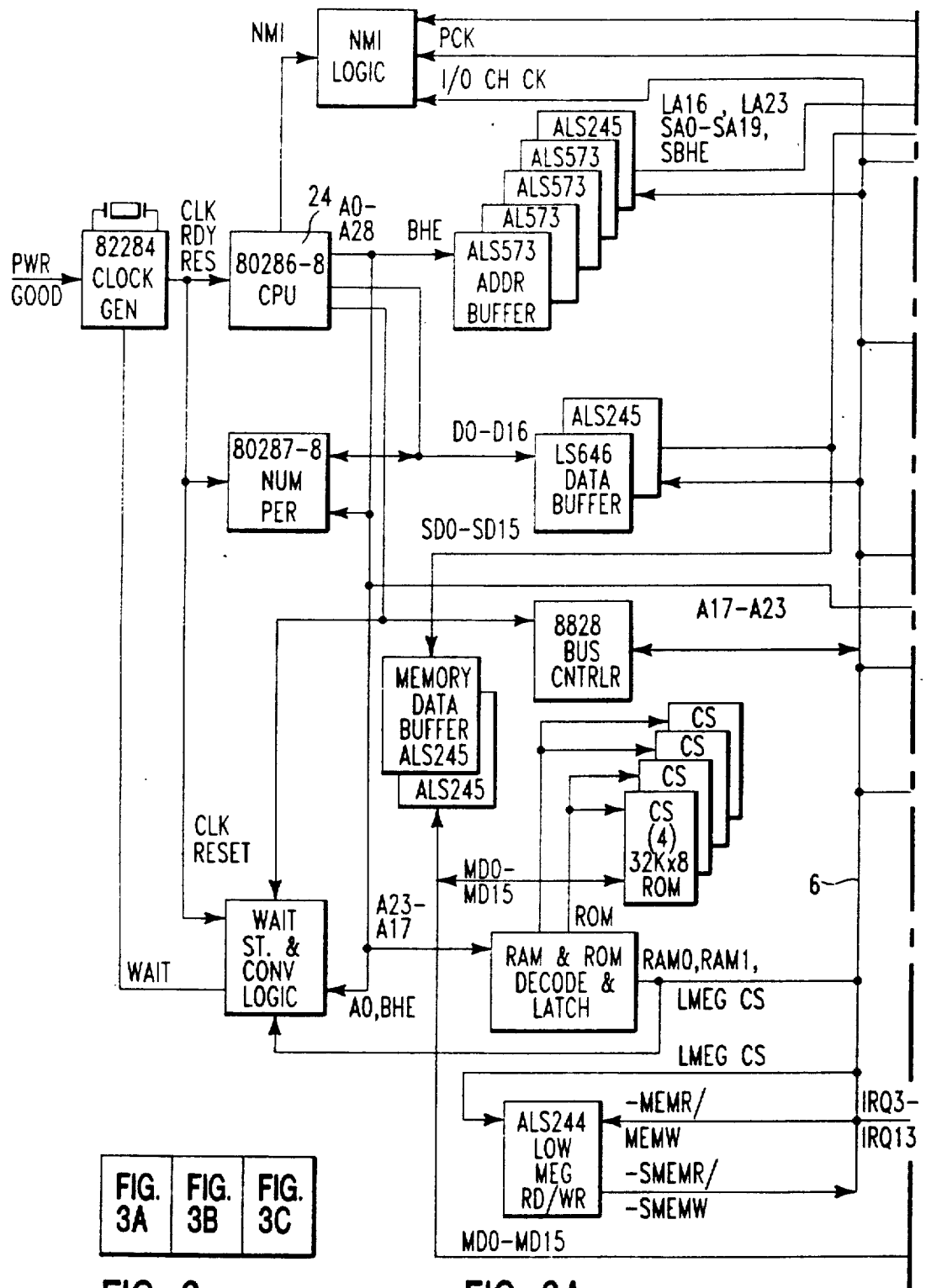
FIGS. 3A-3C, connected as shown in FIG. 3, show the elements of a computer system board in which this invention may be utilized.
Figure 3B:
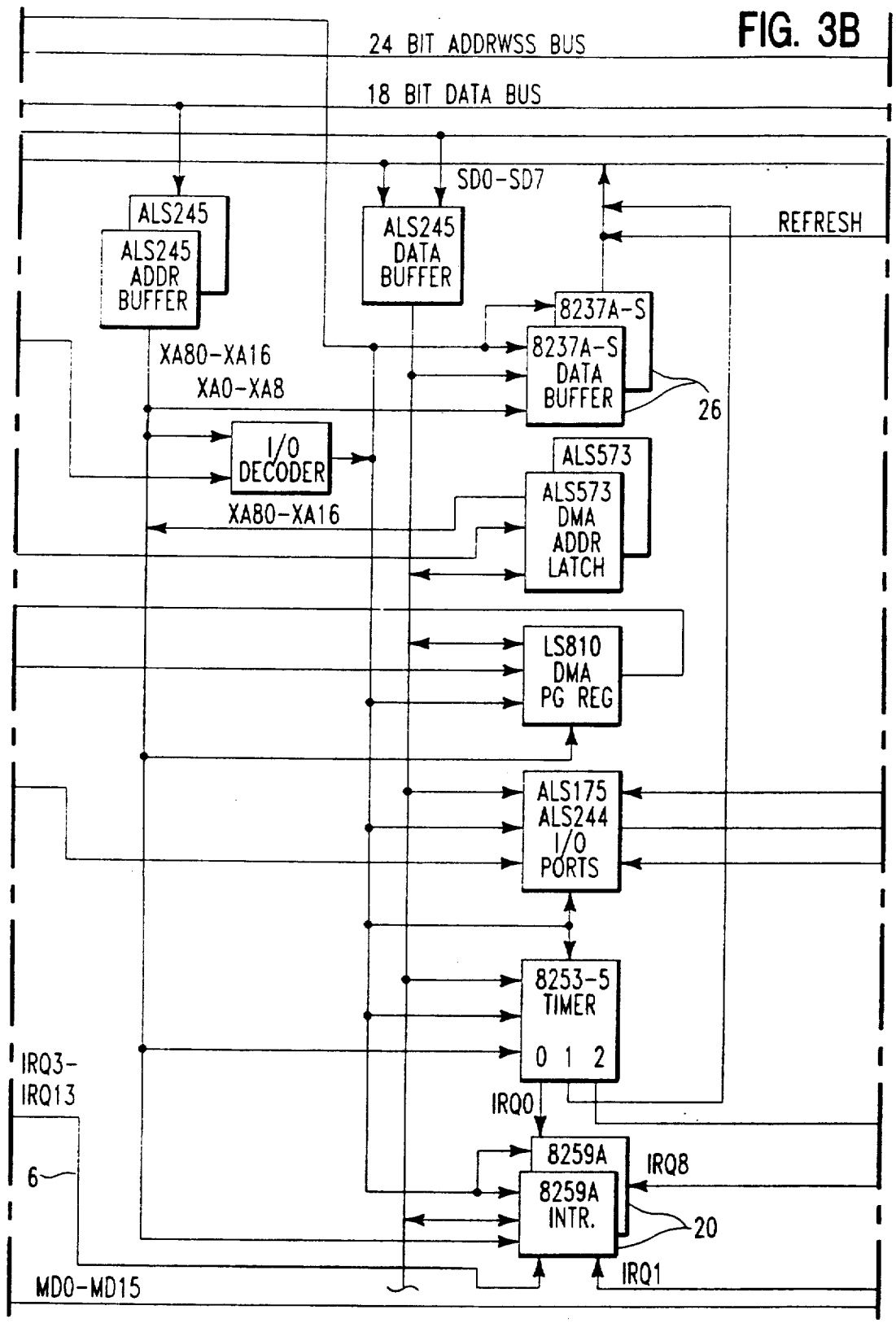
Figure 3C:
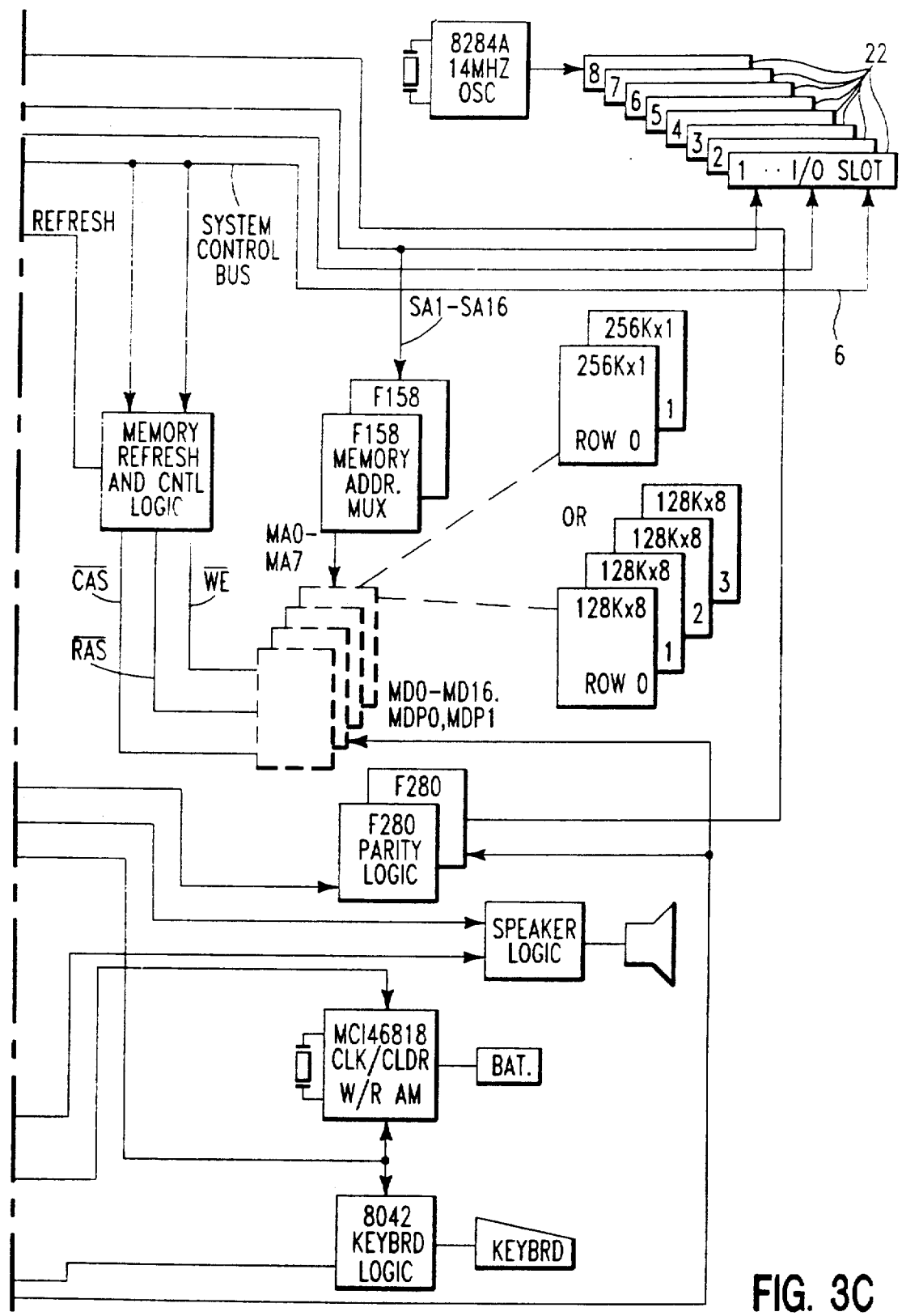

Referring now to FIG. 3, there is shown a block diagram of the IBM AT personal computer. The diagram shows the various elements of the system board and how the components supported by the board are interconnected. Specifically, FIG. 3 shows the interconnection of the I/O devices (I/O slots), the microprocessor, the direct memory access controllers, the interrupt controllers and other supporting components. Since the operation of the elements are well known to those skilled in the art, no specific description thereof is deemed necessary.

While the invention has been described in connection with a preferred embodiment, it should be understood that other elements may be added or other variations will occur to those skilled in the art. For example, the concept of this invention may be used to allow multiple I/O devices to be installed on a single direct memory access channel in a direct memory access controller such as an Intel 8237 DMA controller 26. Further, although the invention was described in connection with the IBM AT personal computer bus system using the Intel 80286 microprocessor, other similar processors such as the Intel 8088, 8086, and 80836 microprocessors could be used and other systems where applicable could be used. Further, the design could be used to convert certain adapters not designed for shared environments to be used in shared environments. These adapters would originally have been designed such that when the low-to-high transition occurs the adapter holds the line high for a time sufficient for the level to be detected and for the identity of the adapter requesting the interrupt is determined. Each card would have its own identifier. Such variations should be considered as being included within the scope of the appended claims.

What is claimed is:

1. A shared hardware interrupt circuit for edge-triggered adapter cards, comprising:
   (a) a power supply,
   (b) an interrupt request line,
   (c) an interrupt request bus,
   (d) at least two I/O connectors, each for connecting an edge-triggered adapter card to said power supply and said interrupt request line,
   (e) diode means located between each said I/O connector and said interrupt request line for preventing the passage of electrical current from said interrupt request line into said I/O connector,
   (f) means connected between said interrupt request line and said interrupt request bus for detecting, inverting, and transmitting a signal on said interrupt request line to said interrupt request bus, said;
   (g) pull-down means connected to said interrupt request line for providing a low level signal on said interrupt request line.

* * * * *